United States Patent

Rinaldi et al.

[11] Patent Number: 6,150,572
[45] Date of Patent: *Nov. 21, 2000

[54] PROCESS FOR THE REGENERATION OF A CATALYST BASED ON TRIVALENT CHROMIUM COMPOUNDS

[75] Inventors: Francesco Rinaldi, Padova; Paolo Cuzzato, Treviso; Letanzio Bragante, Albignasego, all of Italy

[73] Assignee: Ausimont S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,767

[22] Filed: May 2, 1997

[30] Foreign Application Priority Data

May 6, 1996 [IT] Italy ................................ MI96A0892

[51] Int. Cl.$^7$ ............................ C07C 17/00; B01J 20/34
[52] U.S. Cl. ........................ 570/166; 570/165; 570/168; 570/169; 502/38; 502/53; 502/56
[58] Field of Search .................................. 570/165, 166, 570/168, 169; 502/38, 53, 56

[56] References Cited

U.S. PATENT DOCUMENTS 5,057,634  10/1991  Webster et al. ......................... 570/157
5,262,574  11/1993  Carmello et al. ....................... 570/166

FOREIGN PATENT DOCUMENTS 05092141  8/1993  Japan ............................... B01J 38/04

OTHER PUBLICATIONS

Tsuji Katsuyuki et al, Abstract of Japanese Publication No. 05092141, dated Apr. 16, 1993, "Method for Activating and Regenerating Chromium Type Fluorinating Catalyst".

*Primary Examiner*—Savitri Mulpuri
*Assistant Examiner*—Alexander G. Ghyka
*Attorney, Agent, or Firm*—Arent, Fox, Kintner, Plotkin & Kahn

[57] ABSTRACT

Process for the regeneration of a fluorination catalyst based on Cr(III) compounds optionallay supported comprising a) the treatment at 350° C.–400° C. with an air/inert gas mixture and b) treatment at 300° C.–380° C. with a mixture of an inert gas containing from 1 to 10% by volume of hydrogen.

1 Claim, No Drawings

PROCESS FOR THE REGENERATION OF A CATALYST BASED ON TRIVALENT CHROMIUM COMPOUNDS

The present invention relates to a process for the regeneration of fluorination catalysts based on Cr(III) compounds, optionally supported.

The use of Cr(III)-based catalysts in various reactions of halogen-containing organic compounds at high temperatures is well known in the art.

In particular various fluorination catalysts of industrial interest are known, which are based on oxides/oxyfluorides of Cr(III) optionally supported on alumina, fluorinated alumina, aluminium trifluoride, in the reactions in gaseous phase, at high temperatures, between HF and halogen-containing hydrocarbons, with the purpose of introducing fluorine atoms.

From U.S. Pat. No. 5,262,574 and from EP 408,005 it is known the use of $Cr_2O_3$ supported on $AlF_3$ in the fluorination in gaseous phase with HF respectively of $CCl_2=CCl_2$ to obtain $CF_3CHCl_2$ (HCFC-123) and of $CHCl=CCl_2$ and $CF_3CH_2Cl$ (HCFC-133a) to obtain $CF_3CH_2F$ (HFC-134a).

Such catalysts during their use in an industrial fluorination plant tend to deactivate owing to the deposit on their surface of organic contaminants comprising carbonaceous residues and/or organic oligomers deriving from cracking and/or oligomerization of the reacted organic compounds.

In order to reinstate the catalytic activity one generally proceeds to a treatment of the exhausted catalyst with oxidizing gas such as air or oxygen/nitrogen mixtures at sufficiently high temperatures (300–500° C.) so as to cause the combustion of the organic contaminants.

However the above treatment causes also the partial oxidation of Cr(III) to Cr(VI) with consequent loss in the active metal Cr(III), wherefore the catalyst results less active and with a short lifetime.

Moreover the formation of toxic and volatile Cr(VI) compounds results highly undesirable since their dispersion in the environment is regulated by the laws in force which do not allow Cr(VI) concentrations higher than 1 ppm in the sewage waters and even lower concentrations in the gaseous effluents.

In case of use of the so reactivated catalyst in fluorination processes with HF, the Cr(VI) presence results even more undesirable since it reacts with HF by forming oxyfluoride of Cr(VI), $CrO_2F_2$, gaseous at room temperature and toxic, which contaminates the process effluents.

To obviate the loss of chromium of the catalyst during the regeneration with air and in the successive reaction with HF, it has been proposed in 'EP 475,693 to regenerate the catalyst based on chromium compounds by a treatment with an HF/air mixture containing up to 30% by moles of air, at temperatures of 300°–500° C.

However such a process shows the drawback that to avoid the loss of the notable amounts of HF utilized in the regeneration mixture, it is necessary to employ two reactors in which, alternatively, in one reactor it occurs the regeneration of the exhausted catalyst and contemporaneously in the other reactor it occurs the fluorination of the halogen-containing organic compound by recycle of the hot HF directly coming from the reactor under regeneration.

It has now been found a process for the regeneration of exhausted or deactivated catalysts based on Cr(III) compounds which can be carried out in the same reactor containing the catalytic bed, which does not show the inconveniences and the drawbacks of the prior art and allows to obtain a regenerated highly active catalyst, which does not contain Cr(VI) compounds.

The process according to the invention comprises
a) a first phase of treatment with an oxidizing gas, in particular air, carried out with modalities known in the art, and
b) a successive phase of treatment with hydrogen mixed in particulr ratios with an inert gas and at particular temperatures, until the disappearance of the Cr(VI) compounds formed during the previous oxidation phase.

An object of the present invention is therefore a process for the regeneration of a fluorination catalyst, based on Cr(III) compounds optionally supported, exhausted owing to the presence on its surface of organic contaminants, comprising:
a) the treatment of the exhausted catalyst with an air flow or with an oxygen/inert gas mixture, at temperatures from 350° C. to 400° C., until the organic contaminants disappear, and
b) the treatment of the catalyst obtained after phase a) with a flow of a gaseous mixture formed by an inert gas and from 1 to 10 by volume of hydrogen, at temperatures from 300° C. to 380° C., until complete disappearance of the Cr(VI) compounds, formed during the oxidation phase.

The inert gas employed in phases a) and b) is preferably nitrogen.

The amount of hydrogen in admixture with the inert gas preferably ranges from 3 to 6% by volume.

The treatment temperature in phase b) ranges preferably from 310° C. to 340° C., while the pressure is not critical, as it can vary from the atmospheric one to about 5 relative bar.

The time of the treatment in phase b) is generally lower than 1 hour.

The process according to the invention is particularly suitable for the regeneration of a fluorination catalyst based on oxide and/or oxyfluoride of Cr(III) supported on $AlF_3$, $Al_2O_3$ or fluorinated $Al_2O_3$, which has been utilized in the fluorination in gaseous phase with HF of halogen-containing hydrocarbons.

In particular, a catalyst based on oxide and/or oxyfluoride of Cr(III) supported on $AlF_3$ can be continuously utilized for long periods of time in an industrial plant for preparing HCFC-123 from perchloroethylene and HF as described in U.S. Pat. No. 5,262,574, by alternating production periods with regeneration cycles according to the process of the invention, without undergoing substantial losses of chromium and of catalytic activity.

On the contrary, if regeneration is carried out by employing only the oxidation phase a), already after few production/regeneration cycles, substantial losses of chromium from the catalyst and a decay of its catalytic activity are noticed.

Some examples follow for illustrative purposes of the invention.

On the catalysts used in the examples were determined:
the content of carbonaceous substances by TPO analysis (Temperature Programmed Oxidation)
the content of Cr(VI) compounds by oxidimetric analysis by wet way
the catalytic activity by catalytic test.

The TPO analysis, well known in the art, was carried out by letting flow an oxidizing gas on a catalyst sample while it is heated progressively from the room temperature to 700° C. at a programmed speed of 10° C./min. and determining the variation of the composition of the analysis gas in comparison with a reference gas flow which does not pass on the sample.

For the TPO a flow of 40 cc/min. of an oxygen/helium mixture containing 5% by volume of oxygen was utilized.

In the oxidimetric analysis by wet way, well known in the art, the Cr(VI) compounds have been extracted from a catalyst sample by washing with acidified water and, successively, titred with KI/thiosulphate.

The catalytic test comprises the use of a catalyst sample in the standard fluorination of HCFC-133a ($CF_3CH_2Cl$) with anhydrous HF in a molar ratio 133a/HF of 1:4, at a temperature of 320° C.

EXAMPLE

A catalyst based on Cr(III) oxide supported on $AlF_3$, prepared as described in U.S. Pat. No. 5,262,574 containing 7.4% of chromium, was utilized in the continuous synthesis of HCFC-123 from perchloroethylene and HF according to the operating conditions described in Example 1 of the above U.S. patent.

The catalyst, after continuous operation until its catalytic activity, determined by catalytic test, has dropped to 70% of its initial value, is regenerated in situ by means of the following treatments in sequence:

a) treatment with a flow of a nitrogen/air mixture containing 30% by volume of air, at a temperature of 380° C. until disappearance of the organic contaminants, as by TPO analysis, and restoration of the catalytic activity. The TPR and oxidimetric analysis by wet way show that the catalyst contains 0.2% by weight of Cr(VI), b) successive treatment with a nitrogen/hydrogen mixture containing 5% by volume of hydrogen, with a flow-rate of 150 Nl/hour per Kg of catalyst and at a temperature of 325° C. for 50 minutes.

By the oxidimetric analysis by wet way the catalyst does not show the presence of Cr(VI).

The catalytic test shows that the catalyst has the same activity as the initial fresh catalyst.

The so regenerated catalyst is then put again on operation in the synthesis of HCFC-123 where it behaves in the same way as the initial fresh catalyst.

What is claimed is:

1. A process for fluorinating halogen-containing hydrocarbons with HF in a gaseous phase in the presence of a catalyst, based on Cr(III) compounds optionally supported, said catalyst being regenerated by the steps comprising:

a) treating the exhausted catalyst with a flow of air or of an oxygen/inert gas mixture, at temperatures from 350° C. to 400° C., until the organic contaminants disappear, and b) treating the catalyst obtained after phase a) for a time less than 1 hour with a flow of a gaseous mixture formed by an inert gas and from 3 to 6% by volume of hydrogen, at temperatures from 310 to 340° C. until complete disappearance of the Cr (VI) compounds formed during the oxidation phase a).

* * * * *